United States Patent [19]
Davis

[11] 3,710,006
[45] Jan. 9, 1973

[54] MARINE STREAMER CABLE

[75] Inventor: Billy W. Davis, Flagstaff, Ariz.

[73] Assignee: Schlumberger Technology Corporation, New York, N.Y.

[22] Filed: July 1, 1971

[21] Appl. No.: 158,838

[52] U.S. Cl. ............................ 174/101.5, 174/113 C
[51] Int. Cl. ................................................ H01b 7/12
[58] Field of Search .......... 174/101.5, 113 C; 57/149; 161/175, 176

[56] References Cited

UNITED STATES PATENTS

| 73,487 | 1/1868 | Arman | 174/116 |
|---|---|---|---|
| 1,700,434 | 1/1929 | Dodge | 174/116 |
| 2,231,869 | 2/1941 | Andrews | 174/101.5 X |
| 3,446,002 | 5/1969 | Kippan | 161/176 X |

FOREIGN PATENTS OR APPLICATIONS 933,755   8/1963   Great Britain........................161/176

OTHER PUBLICATIONS

Brady Material Handbook McGraw Hill N.Y. Ninth ed. 1959 p. 607

*Primary Examiner*—E. A. Goldberg
*Attorney*—Ernest R. Archambeau, Jr. et al.

[57] ABSTRACT

A marine streamer cable of layered solid construction and having substantially the same composition density as sea water, comprising a flotation layer surrounding a cable core having as a central stress member a polypropylene rope made with paralleled fibers held together by an extruded plastic jacket, the use of which minimizes the weight of the cable and serves to greatly attenuate the propagation along the cable of mechanical noise.

2 Claims, 2 Drawing Figures

MARINE STREAMER CABLE

This invention relates to a new and improved marine streamer cable having a center stress member that minimizes cable weight and functions to suppress the propagation of mechanical noise longitudinally along the cable.

A marine streamer cable is towed through the water behind a boat and is provided with detectors such as hydrophones that are sensitive to reflected wave energy in order to map the profile of geological strata underlying the sea bottom. In typical practice, a streamer cable is quite lengthy, and may be, for example, about a mile long, and is formed by a number of discrete streamer cable sections connected end-to-end. In view of the lengthy construction, there is considerable resistance to towing due to water friction and the like, and it is common practice to utilize a stress member in the cable to carry the tension load and prevent elongation of the cable which otherwise can cause damage to the electrical conductors that carry the signals from the hydrophones to the onboard recording equipment.

The stress members of prior art streamer cables have been constituted by steel wire rope. Although wire rope is quite adequate as a tension bearing member, it has three primary disadvantages. First, wire rope is a fairly heavy material, necessitating a larger diameter cable section to be neutrally buoyant in water. However, larger diameter cables are more noisy under tow due to turbulence at the outer skin surface thereof. Second, wire rope is easily corroded when subjected to an environment such as salt water. Finally, wire rope due to its high modulus of elasticity tends to propagate mechanical noise and other low frequency vibration longitudinally along the cable. Common sources of such noise are vibration of the lead-in cable where it breaks water, ship vibration and vibration due to turbulent flow around the ship's propellers. Moreover, discontinuities in cable diameter at connections between sections create some turbulence under tow. The vibrations can be picked up by the hydrophones as noise signals because typical hydrophones, although primarily sensitive to upcoming pressure waves, are somewhat motion sensitive in other directions. Of course the noise signals provide unwanted information in the seismic record.

A general object of this invention is to provide a new and improved marine streamer cable having a center stress member with adequate tension bearing capacity that is lightweight and functions to suppress noise traveling along the cable.

This and other objects are attained in accordance with the concepts of the present invention through the provision of a seismic streamer cable of layered construction with a foam buoyancy layer surrounding an inner cable core. A stress member extending through the center of the cable core is in the form of a polypropylene rope having sufficient tension capacity for mechanical integrity. The polypropylene rope is preferably formed of a number of parallel yarns under equal tension, each yarn being formed of paralleled fibers thrown into a low twist, the fibers being equally tensioned. The parallel yarns are held together in a bundle by an extruded plastic jacket. The yarns are without lay angle so that the rope does not tend to twist under tension. The rope has a more favorable strength/weight ratio than steel wire rope, enabling a reduction in cable diameter without loss of tension capacity. The rope has a low modulus of elasticity compares to steel and thereby suppresses or attenuates the transmission of low frequency vibration longitudinally along the cable. Thus unwanted noise signals are reduced to a minimum.

The present invention has other objects and advantages that will become more clearly apparent in connection with the following detailed description of a preferred embodiment, taken in conjunction with the appended drawing in which.

Figure 1:
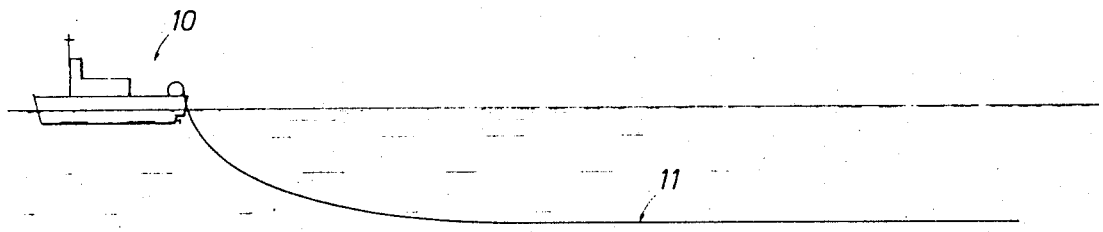
FIG. 1 is a schematic view of a marine streamer cable under tow.

Referring initially to FIG. 1, a seismic exploration boat 10 is shown towing a marine streamer cable 11 through the water. The cable 11 can be quite lengthy as previously discussed and is normally composed of a number of individual sections connected end-to-end with the forward section connected to the tow boat 10 by a typical lead-in section. Each streamer cable section contains a number of typical hydrophones (not shown) spaced as desired, with the phones of each section being coupled by electrical conductors extending along the cable to conventional signal processing and recording equipment onboard the boat. As will be appreciated by those skilled in the art, acoustic wave energy is provided in the vicinity of the cable by a shot boat, or by vibration or pulse producing systems, or other conventional equipment, and the wave energy travels downwardly through the earth. At levels where there is a velocity propagation contrast, a portion of the wave energy is reflected upwardly, and seismic reflections traveling upward through the water produce acoustic pressure waves that cause the hydrophones to respond. The cable 11 is towed normally at a depth of about 40 ft. below the surface for best reception, and various well known depth control systems (not shown) are used to maintain the cable at proper depth.

Figure 2:
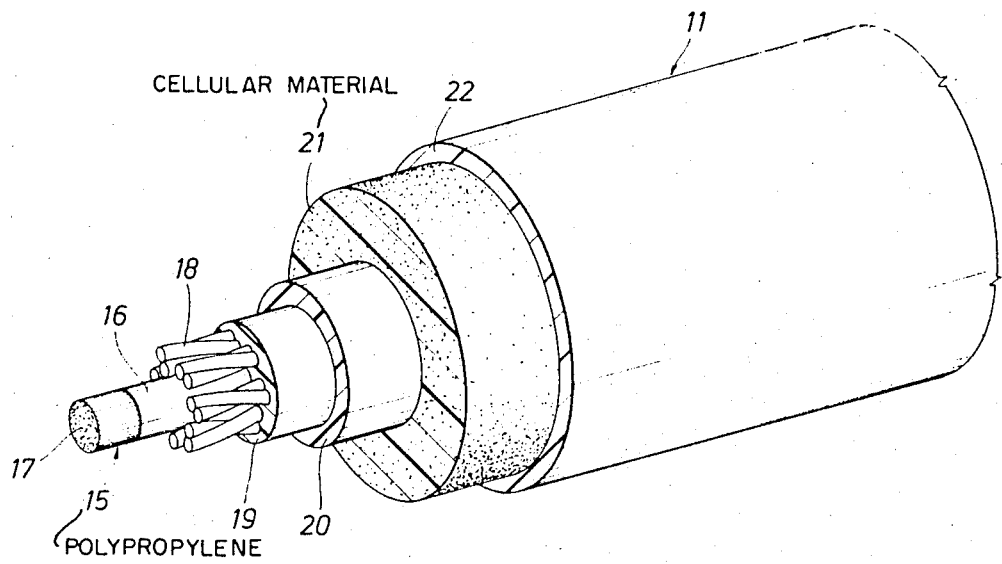
FIG. 2 is a detailed sectional view of a streamer cable constructed in accordance with the principles of this invention.

As shown in detail in FIG. 2, the cable 11 has a layered solid construction. The core of the cable comprises a center stress member 15 that is a small diameter, for example, 0.250 inches, polypropylene rope surrounded by an extruded polyethylene jacket 16. The rope 15 comprises a large number of low twist yarns 17 that are paralleled under carefully controlled tension, the bundle of yarns being held together by the jacket 16. Since the yarns lay parallel to the axis of the cable 11, the rope is neutral as to twist. Each yarn 17 consists of equally tensioned, parallel fibers. A rope having this particular construction can be purchased from the Colombian Rope Company, Auburn, New York under the trade mark "Nolaro".

A plurality of twisted pairs of electrical conductors 18 are cabled around the stress member on a right lay angle, for example, with the voids between conductors filled with a suitable filler compound 19. If desired, a tape binder can be wrapped around the bundle of conductors 18. An inner neoprene jacket 20 is extruded over the conductors 18 and the filler 19, and the next layer is a flotation jacket 21 constituted by a special cellular compound that can be foam extruded to appropriate dimensions based on the desired buoyancy that is required. For details of a cellular compound that is particularly suited to this application, reference may be had to U.S. application Ser. No. 105,547, filed Jan. 11, 1971, and assigned to the assignee of the present invention. Finally an outer jacket 22 of polyethylene is extruded on the cable to provide a relatively smooth external surface.

As previously mentioned, the use of polypropylene rope 15 having the internal construction noted above as a center stress member, as opposed to steel wire rope in the prior art, provides unusual results. There is no tendency of the core to twist under tension, and the material is corrosion free. The material is lightweight to enable a reduction in cable diameter with the composite cable having about the same density as sea water, the diameter reduction improving the noise-free characteristics of the cable. Most importantly, the rope has a low modulus of elasticity compared to steel, so that low frequency vibrations are attenuated against passage along the cable to significantly reduce the noise level below what has previously existed in prior cables.

Since certain changes or modifications may be made in the disclosed embodiment without departing from the concepts involved, it is the aim of the appended claims to cover all such changes or modifications falling within the true spirit and scope of the present invention.

I claim:

1. A marine streamer cable comprising: a stress member constituted by polypropylene fibers thrown into low twist yarns and held together in a bundle by an extruded plastic jacket; a plurality of pairs of electrical conductors cabled around said stress member and embedded in a filler matrix; and a flotation jacket about said stress member having a density and transverse dimension such that the composite cable is substantially neutrally buoyant in water.

2. The streamer cable of claim 1 wherein said yarns all lay substantially parallel to the longitudinal axis of the cable.

* * * * *